April 25, 1961
H. I. McCAIN
2,980,948
HOLDER FOR SCALING FISH
Filed May 7, 1959
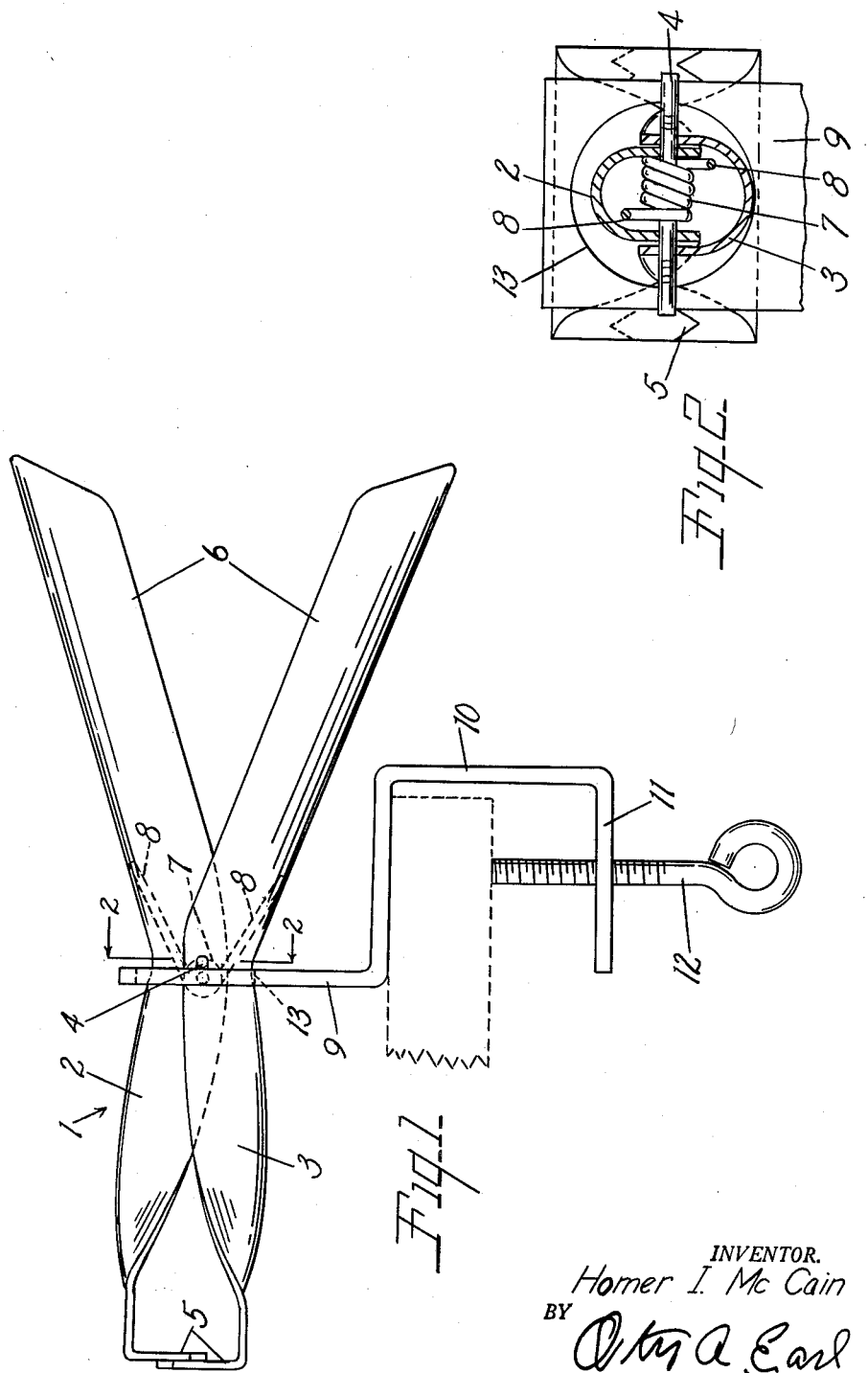
INVENTOR.
Homer I. Mc Cain
BY
ATTORNEY

United States Patent Office 2,980,948
Patented Apr. 25, 1961

2,980,948

HOLDER FOR SCALING FISH

Homer Ivy McCain, 423 5th St., Traverse City, Mich.

Filed May 7, 1959, Ser. No. 811,698

2 Claims. (Cl. 17—8)

This invention relates to improvements in holder for scaling fish. The principal objects of this invention are:

First, to provide an implement which is easily attached to a table for holding fish while they are being scaled.

Second, to provide a holder having a bracket removably attachable to a table and a manually operable clamp engageable with the tail of a fish and rotatably connected to the bracket so that the fish can be laid flat on the table with either side upright and held against longitudinal displacement while the scales are removed from the fish.

Third, to provide a holder of the type described which is simple and inexpensive and easy to operate and which securely grips a fish during the scaling operation.

Other objects and advantages of the invention will be apparent from a consideration of the following description and claims. The drawings, of which there is one sheet, illustrates a highly practical form of the holder.

Fig. 1 is a side elevational view of the holder.

Fig. 2 is a fragmentary transverse cross sectional view taken along the plane of the line 2—2 in Fig. 1 to an enlarged scale.

It is well known that fish are limp, slippery bodies which are difficult to hold while removing their scales and many implements have been devised to facilitate the scaling operation. The present invention provides a gripper generally indicated at 1 and consisting of a pair of angled arms 2 and 3 of transversely U-shaped cross section. The arm 2 is somewhat narrower in cross section than the arm 3 and fits partially within the wider arm at the central longitudinal angle in the arms and the side flanges of the arms are laterally overlapped and pivotally connected by a transverse pivot pin 4. Coacting toothed jaws 5 are formed on one end of the arms 2 and 3 and the opposite ends of the arms form divergent manually operable handles 6. A coil spring 7 disposed around the pivot pin 4 within the arms 2 has its ends 8 bearing against the insides of the arms to spread the handles 6 and hold the jaws 5 closed.

The gripper 1 is disposed through an upstanding bar 9 on the upper branch 9a of a U-shaped mounting clamp 10. The lower branch 11 of the mounting clamp carries a threaded thumb screw 12 by means of which the clamp may be secured to the edge of a table or bench. The upstanding bar 9 defines a circular aperture 13 which is desirably smaller in diameter than the width of the jaws 5 and the spread of the handles 6 so that the gripper is loosely but freely rotatably supported by the bar 9. The pivot pin 4 desirably is longer than the diameter of the aperture 13 to bear against the bar 9.

The operation of the implement is obvious. The clamp 10 is attached to the edge of a suitable table by the thumb screw 12 and the handles 6 squeezed together to open the jaws 5. The tail of a fish to be scaled is inserted in the jaws and the handles 6 are released so that the spring 7 causes the jaws to tightly grip the tail. The body of the fish is then supported flat on the table and the force of removing the scales from the tail toward the head of the fish is resisted by engagement of the pivot pin 4 with the upstanding bar 9. When one side of the fish is scaled, it is easily turned over by simply rotating the gripper 1 in the aperture 13 without releasing the jaws 5. The scaling operation is then carried out on the other side of the fish.

What is claimed as new is:

1. Means for holding fish for facilitating the scaling thereof comprising a supporting bracket adapted to be fixedly mounted on a support and including a rigid arm projecting outwardly from the support on which the bracket is mounted, said arm having a gripper receiving opening therein, and a gripper comprising a pair of oppositely angled gripper members of inwardly facing channel cross section disposed with the side members thereof in overlapping relation at the angles thereof, a pivot disposed through the overlapping side members at the angle thereof and projecting laterally from both sides of the gripper members, a spring supportedly mounted on said pivot within said gripper members and terminating at its ends in arms housed within and engaging said gripper members, the gripper members at one side of the pivot constituting hand pieces and terminating at their other ends in inwardly projecting opposed gripper jaws, the gripper being freely rotatable and tiltable within the opening in said supporting bracket, the pivot projecting laterally from the gripper members at both sides thereof to such degree that it engages the supporting bracket in any rotated position of movement or adjustment of the gripper within the said supporting bracket.

2. Means for holding fish for facilitating the scaling thereof comprising a supporting bracket adapted to be fixedly mounted on a support and including a rigid arm projecting outwardly from the support on which the bracket is mounted, said arm having a gripper receiving opening therein, and a gripper comprising a pair of oppositely angled gripper members of inwardly facing channel cross section disposed with the side members thereof in overlapping relation at the angles thereof, a pivot disposed through the overlapping side members at the angle thereof, a spring supportedly mounted on said pivot within said gripper members and terminating at its ends in arms housed within and engaging said gripper members, the gripper members at one side of the pivot constituting hand pieces and terminating at their other ends in inwardly projecting opposed gripper jaws, the gripper being freely rotatable and tiltable within the opening in said supporting bracket, the hand pieces projecting laterally from the pivot in the closed position of the jaws to such degree that they project beyond the edge of the opening in the supporting bracket in any position of movement or adjustment of the gripper within the said supporting bracket so as to obstruct pulling the handles through the opening by pulling on the jaws.

References Cited in the file of this patent

UNITED STATES PATENTS

| 1,632,194 | Possehl | June 14, 1927 |
| 2,686,334 | Miller | Aug. 17, 1954 |
| 2,801,877 | Hetrick | Aug. 6, 1957 |